H. J. WELLS.
GLASS TUBE CUTTER.
APPLICATION FILED AUG. 31, 1915.
1,170,588.
Patented Feb. 8, 1916.
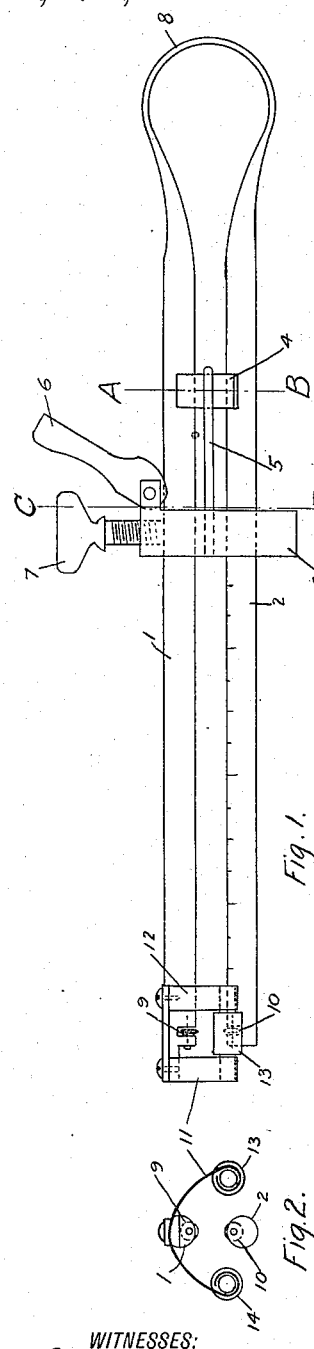
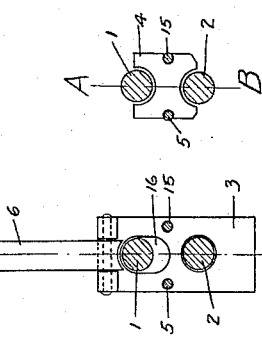
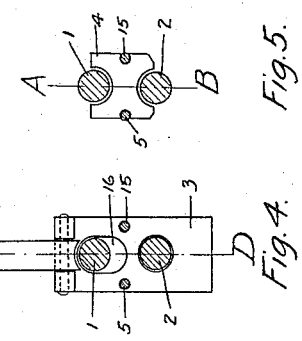
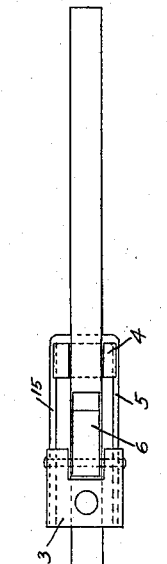
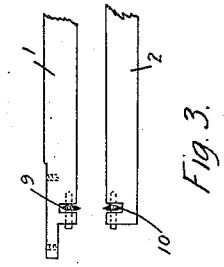
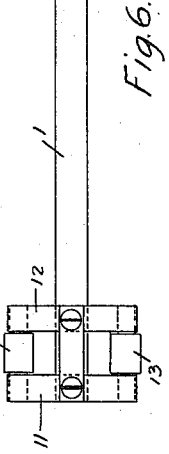
WITNESSES:
P. H. Chown
P. W. Williams
INVENTOR
Harry J. Wells.
BY
Jas. H. Cary
ATTORNEY

UNITED STATES PATENT OFFICE.

HARRY J. WELLS, OF PORTLAND, OREGON.

GLASS-TUBE CUTTER.

1,170,588.  Specification of Letters Patent.  Patented Feb. 8, 1916.

Application filed August 31, 1915. Serial No. 48,200.

*To all whom it may concern:*

Be it known that I, HARRY J. WELLS, a citizen of the United States, residing at Portland, in the county of Multnomah and State of Oregon, have invented certain new and useful Improvements in Glass-Tube Cutters, of which the following is a specification.

My invention relates to glass cutters that are operated by hand and while particularly designed to cut glass of tubular form, may also be used to advantage on flat surfaces.

The object of the invention is to provide a simple device that will cut the glass more accurately and with greater certainty than has heretofore been done, and consists in three novel features that contribute to this result; the use of a cutter wheel on each arm of the cutter, a sliding fulcrum block to accurately direct the pressure and a roller guide directly over the incision and properly supporting the tube.

Figure 1 is a side view showing two parallel rods 1 and 2 and the spring 8 made integral therewith, also a cutter wheel, 9 and 10 respectively, at the free end of each rod or arm; Fig. 2 is an end view of the cutting part; Fig. 3 is a side view of the cutting part with the guides 11 and 12 removed; Fig. 4 is a section through C D, Fig. 1, showing end view of vertically slotted guide block 3; Fig. 5 is a section along line A B Fig. 1, through fulcrum block 4; Fig. 6 is a plan showing the two spring guides 11 and 12 and the guide rollers 13 and 14.

1 and 2 are parallel rods with flat spring part 8 at one end. The guide block 3 is slipped over the ends of the rods so that the bottom rod fits snugly in the lower opening therein and the top rod is in the vertical slot 16. Attached to this guide block by the small rods 5 and 15 is the sliding fulcrum block 4. The lever 6, pinned to the top of guide block 3, operates when pressed down, to engage rod 1 and move it toward rod 2. Fulcrum block 4 is a solid metal piece, with half round grooves on top and bottom adapted to receive the rods 1 and 2 respectively, fitting same closely but allowing the block to slide along the rods. The free ends of rods 1 and 2 are slotted as shown in Fig. 3 and a cutter wheel or disk is journaled in each of the slots, with axis longitudinal with the rods, as at 9 and 10, so that the cutting edges are exactly opposite each other and in the same plane. The end guide is shown in Figs. 2 and 6. Two strips of spring steel are so bent that they approach a semi-circle in form and are mounted near the end of top rod 1; the ends of the guides are turned over so as to provide a suitable bearing or holder for the journals of two small rollers that are thus held on each side of the top rod. The rollers are so placed that they are central in relation to the cutting edges of 9 and 10. The lower arm or rod 2 is graduated as shown so as to indicate exactly the length it is desired to cut off the glass tubes. The cutting edges may of course be of any glass cutting material, metal or stone, and may rotate or be fixed.

The usual method described to use implements of this character is to turn the device itself, but I find the most convenient way, as well as the one obtaining the best results, is to hold the cutter in the left hand and the glass tube in the right hand. The lower rod is inserted in one end of the tube to be cut and the sliding guide block 3 brought against the end of the tube so that it will hold the tube to the proper length to be cut off. The left thumb presses down the lever 6,—or the screw 7 may be turned until the proper tension is obtained,—and then the tube is slowly turned until it has completed a revolution, or perhaps two if that is felt necessary with a heavy and refractory tube. The cutting edges of 9 and 10 being directly opposite one another and in the same plane, will cut the glass in perfect alinement on the outside as well as on the inside of the tube, the guide rollers 13 and 14 steadying the tube and supporting it just over the incision and a clean, square break is effected.

In the common form of tube cutter when the lever 6 is pressed down to engage the top rod, the spring is the fulcrum and it being resilient much of the pressure is dissipated and is not effective at the cutting point at the free ends of the rods. Also if the lever engages the top rod about midway between the spring and the cutters, the pressure on the rod tends to bow or bend the same so that the cutting edge is at an acute instead of a right angle to the surface of the glass tube. I overcome these defects by the solid sliding fulcrum block 4, attached by the small rods 5 and 15 to the guide block 3 and moving with it along rods 1 and 2. There being but little play between the fulcrum block and the two rods, when the lever is pressed, the block immediately engages the rods and becomes the fulcrum, thus helping to exert the pressure at the point desired, at the cutting edges of 9 and 10 at the free ends of the arms. Also the rods being at all times thus held substantially parallel, the cutting edges do their work at right angles to the surface of the tubes.

I claim,—

1. A glass tube cutter comprising two parallel rods, with spring part made integral therewith and forming the closed end, a sliding guide block with pressure lever, a sliding fulcrum block attached to said guide block and located between the rods, a cutting wheel mounted at the end of each rod, so that their axes are longitudinal with the rods and their cutting edges are opposite each other and in the same plane, and an end guide attached to top arm or rod and supporting two roller wheels, one on each side of arm, their faces respectively being at right angles to the cutting edge of each cutter and located centrally over same.

2. In a glass tube cutter of the class described, the combination with a parallel armed holder with guide block and pressure lever, of a sliding fulcrum block between the arms, on the side of the guide block nearest to the closed end of the cutter.

3. In a glass tube cutter of the class described, the combination with a parallel armed holder, with guide block and pressure lever, of an end guide comprised of two spring supported roller wheels, one on each side of the top arm and attached thereto, their faces at right angles to the edges of the cutters and located centrally over same.

4. In a glass tube cutter of the class described, in combination with a parallel armed holder, with guide block and pressure lever, of a sliding fulcrum block between the arms and an end guide comprised of two spring supported roller wheels, one on each side of the top arm, and attached thereto, their faces being at substantially right angles to the plane of incision.

5. In a glass tube cutter of the class described, the combination with a parallel armed holder with guide block and pressure lever, of a sliding fulcrum block between the arms and a cutter wheel placed at the free end of each arm, the axis of each wheel being longitudinal with the arm on which it is mounted and the cutting edges of the wheels being opposite each other and in the same plane.

6. In a glass tube cutter of the class described, in combination with a parallel armed holder with guide block and pressure lever, of a cutter wheel placed at the free end of each arm, the axis of each wheel being longitudinal with the arm on which it is mounted and the cutting edges of the wheels being opposite each other and in the same plane, and an end guide comprised of two spring supported roller wheels, one on each side of the top arm and attached thereto, their faces at substantially right angles to the edges of the cutters.

HARRY J. WELLS.

Witnesses:
T. S. ROBINSON,
LESLIE CRAVEN.

Copies of this patent may be obtained for five cents each, by addressing the "Commissioner of Patents, Washington, D. C."